E. V. BANKS.
CAMERA.
APPLICATION FILED MAY 3, 1913.

1,173,083.

Patented Feb. 22, 1916.

Witnesses.
L. Chuwright
E. P. Hall

Inventor.
E. V. Banks
by J. Edward Maybee
Atty

UNITED STATES PATENT OFFICE.

ERNEST V. BANKS, OF TORONTO, ONTARIO, CANADA.

CAMERA.

1,173,083.      Specification of Letters Patent.     Patented Feb. 22, 1916.

Application filed May 3, 1913. Serial No. 765,340.

*To all whom it may concern:*

Be it known that I, ERNEST V. BANKS, of the city of Toronto, in the Province of Ontario, Canada, have invented certain new and useful Improvements in Cameras, of which the following is a specification.

My object is to devise means for shortening the exposure of the sensitive surface so that a good negative can be obtained with much shorter exposure than is at present possible, thereby making it possible to obtain good pictures with an ordinary outfit under conditions where otherwise it would be impossible.

I attain my object by constructing the apparatus so that all the light projected on the plate or film by the lens is utilized in affecting the latter, substantially as hereinafter described and illustrated in the accompanying drawings, in which—

Figure 3:
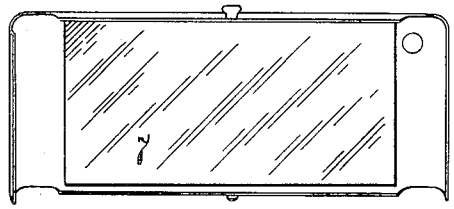
Figure 2:
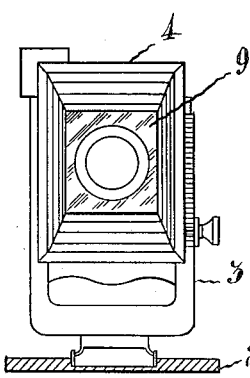
Figure 1:
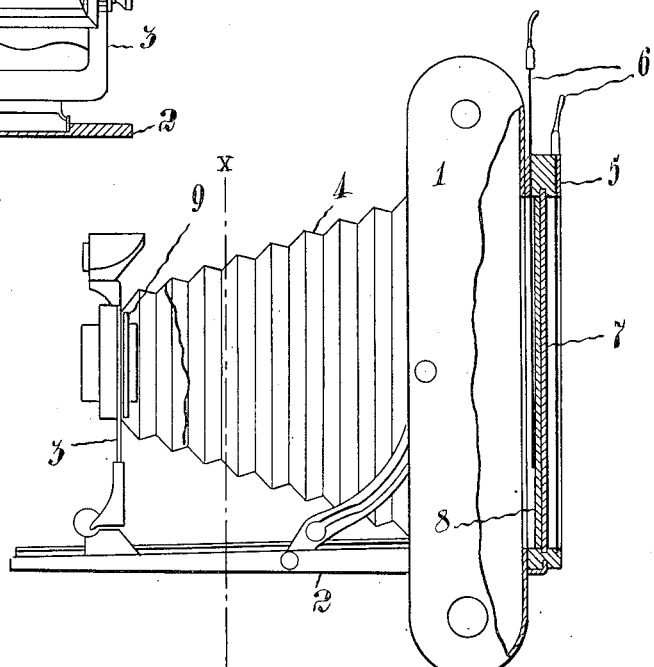

Figure 1 is a side elevation, partly in section, of a camera constructed in accordance with my invention, Fig. 2 is a cross-section on line $x$—$x$ of Fig. 1 looking toward the front board, and Fig. 3 is a perspective detail showing a mirror applied to a film holder back.

In the drawings like numerals of reference indicate corresponding parts in the different figures.

The camera in the main is of ordinary construction, 1 being the body of the camera and 2 the support on which the front board 3 is carried in the ordinary manner. The camera shown, it will be seen, is of the ordinary folding type, but it must be understood that the invention is applicable to any form of camera. The bellows 4 are connected with the front board of the body in the ordinary manner.

5 represents a plate holder carried by the back of the body in the ordinary manner.

6 are the slides of the plate holder, the front slide being shown as partly drawn.

The septum or division between the halves of the plate holder instead of being formed of an opaque dark substance is in my camera formed of a mirror 7 which might be either polished metal or, which is preferable, of silvered glass. This mirror has its face preferably in contact with the plate 8. Of course, if both sides of the plate holder are fitted in accordance with my invention two mirrors will be required placed back to back, so that the plate in each half of the plate holder has a mirror-like surface behind it.

As the plate is backed by a reflecting surface it follows that any transmitted light is reflected by the mirror and intensifies the action on the sensitive coating of the plate, instead of being absorbed by the septum and lost, as in ordinary cameras. I find that this arrangement effects a very marked reduction in the length of the exposure necessary to obtain a good negative. I find that the action is also improved by locating a mirror 9 on the front board of the camera surrounding the lens and facing toward the rear of the camera. This mirror may be of polished metal or silvered glass. While I prefer to employ a mirror-like surface behind the plate, a measure of advantage may be obtained by using a white surface instead. Nor is it essential that the mirror be separate from the plate as the back of the plate may be silvered and the same effect produced.

In Fig. 3 I show a mirror applied to the back of a film holder where it lies behind the path of the film. It will be understood that the term "camera" as used in the claims is applied to picture taking apparatus including any means whatever for supporting a sensitive surface, whether detachable from the body of the camera or not.

What I claim as my invention is:—

1. A camera provided with means for supporting a sensitive film and its transparent support, and having a forwardly facing solid mirror supported therein behind the position occupied by the sensitive surface and in position to be in close contact with the back of said support, so that the support lies between the mirror and the sensitive surface.

2. A camera provided with means for supporting a sensitive film and its transparent support, and having a forwardly facing solid mirror supported therein behind the position occupied by the sensitive surface and in position to be in close contact with the back of said support, and a second mirror supported at the front of the camera about the lens and facing rearwardly.

3. A camera provided with means for supporting a sensitive surface and means for supporting a solid mirror behind and close to the support of the sensitive surface, so that the support lies between the mirror and the sensitive surface.

4. For use in a camera, means for supporting a sensitive film and the transparent support carrying said film; and a solid mirror surface carried by the supporting means close behind the position of the said transparent support for the film.

Toronto, this 26th day of April, 1913.

ERNEST V. BANKS.

Signed in the presence of—
E. P. HALL,
L. LAW.